United States Patent [19]

Schrenk et al.

[11] Patent Number: 4,791,036

[45] Date of Patent: Dec. 13, 1988

[54] ANODE CONDUCTOR FOR ALKALINE CELLS

[75] Inventors: David J. Schrenk; Patrick E. Murphy, both of LaGrange, Ga.

[73] Assignee: Duracell Inc., Bethel, Conn.

[21] Appl. No.: 140,952

[22] Filed: Jan. 11, 1988

Related U.S. Application Data

[63] Continuation of Ser. No. 923,941, Oct. 28, 1986, abandoned.

[51] Int. Cl.$^4$ ............................................. A01M 2/26
[52] U.S. Cl. .................................. 429/178; 429/211; 420/490
[58] Field of Search ............... 429/174, 105, 245, 178, 429/158, 159, 211; 420/470, 490

[56] References Cited

U.S. PATENT DOCUMENTS

| | | | |
|---|---|---|---|
| 2,017,025 | 10/1935 | Cornell | 420/490 |
| 2,058,884 | 10/1936 | Jennison | 420/490 |
| 3,694,267 | 9/1972 | Angelovich | 429/165 |
| 3,740,271 | 6/1973 | Jammet et al. | 429/165 |
| 3,810,790 | 5/1974 | Denis | 429/158 |
| 4,594,221 | 6/1986 | Caron et al. | 420/490 |

*Primary Examiner*—Donald L. Walton
*Attorney, Agent, or Firm*—Ronald S. Cornell; James B. McVeigh

[57] ABSTRACT

This invention pertains to an anode current collector for alkaline electrochemical cells having zinc anodes. An anode current collector made from silicon bronze alloy has improved welding characteristics and has a minimal effect on gassing.

8 Claims, No Drawings

ANODE CONDUCTOR FOR ALKALINE CELLS

This application is a continuation of United States patent application Ser. No. 923,941, filed on Oct. 28, 1986, now abandoned.

This invention relates to an improved anode collector for alkaline electrochemical cells. Generally speaking it is a nail type collector made from an alloy which has more universal welding properties than conventional alloys and has a minimal impact on the gassing rate of both fresh and partially discharged cells.

Cylindrical alkaline cells having a manganese dioxide ($MnO_2$) cathode and a zinc (Zn) anode are generally manufactured using a bobbin cell design. This design has a cylinder of cathode material which is pressed up against the cell casing. The cavity of this cathode cylinder is fitted with a separator material. A mixture comprising particulate zinc anode material is introduced into this separator lined cavity. A plastic grommet having a centrally located hole is often crimped in place over the open end of the cell casing. Electrical contact is typically made to the zinc anode by force fitting an element such as a nail down through the hole in the grommet and into the zinc anode mixture. The top of the element extends above the plastic grommet and is used to make electrical contact. For some cell sizes this element is nail shaped and the head of the nail acts as the negative terminal. Cells of this design are often connected in series to form higher voltage batteries such as 6 V or 9 V. These cells are connected in series by welding strips of metal, or tab stock, from the negative terminal of one cell to the positive terminal of another cell. The welding procedure used in attaching the tab stock is facilitated by using parallel gap welding electrodes. A series orientation of the welding electrodes is undesirable since the tab stock would have to be welded to the nail head prior to insertion into the zinc anode and this is a more difficult manufacturing procedure.

Various types of materials have been used in the past in forming the nail. The most common choice of alkaline battery manufacturers is brass, typically having a composition of 70% copper and 30% zinc. While this material welds satisfactorily when using the series welding procedure, it is disadvantageous to use brass when using parallel gap electrodes because it does not weld well with such equipment.

Cells having alkaline electrolytes and zinc anodes are prone to generate hydrogen gas under certain conditions. Gassing is undesirable since if it is excessive it can cause the cell to vent and leak alkaline electrolyte. Zinc anodes are typically amalgamated with mercury which has the effect of raising the electrochemical potential at which hydrogen gas will evolve. Cells using brass nails from a gassing standpoint are generally acceptable to alkaline battery manufacturers. From the above description it will be clear that there is a need for material which is suitable for parallel gap welding and capable of providing cells having acceptable gassing rates.

An alloy known as nickel-silver has been identified as one which is more suitable than brass for parallel gap welding. It has been used in the commercial production of alkaline cells which require parallel gap welding of the nail head to tab stock material. The composition of this alloy is about 8% nickel, 62-64% copper, and 28-30% zinc. Since this alloy does weld better than brass, its use has reduced the excessive scrap rates and the downtime of alkaline cell production lines which are inherent in the use of brass as nail material. However, one serious disadvantage of nickel-silver is that it is more costly than brass. In addition, it results in higher gassing rates in partially discharged cells than cells which use brass collectors.

Generally speaking the present invention pertains to the use of silicon bronze alloys as the material for the current collector. These alloys are not only more suitable for parallel gap welding but they are relatively less expensive than nickel-silver, and they provide an unexpected reduction in the gassing behavior of partially discharged cells. The gassing rate is at least as good when silicon bronzes are used as when brass is used as the nail material. However silicon bronze is more suitable to parallel gap welding than brass and is more like nickel silver in this respect. It will therefore be evident that silicon bronze collectors contribute the best attributes of both types of collectors heretofore used. Silicon bronze nails are also an improvement over prior art collectors since they can be used universally in the production of alkaline cells. This alloy works well both for series welding and for parallel gap welding. Therefore an alkaline cell production plant need only stock one type of nail material for use in either appliction.

Generally speaking, silicon bronzes are comprised of at least 85% by weight copper and 1% by weight silicon. The remainder is comprised of varying quantities of zinc, manganese, iron, aluminum, tin, lead and mixtures thereof depending on the particular alloy. (All percentages discussed herein are in terms of % by weight unless otherwise indicated.) For example, a silicon bronze alloy that is suitable for casting has about 87% copper and about 4% silicon with the remainder being comprised of 4% zinc, 1% aluminum, 1% tin, 2% iron, and 1% manganese. Aluminum-silicon bronze is comprised of about 91% copper and about 2% silicon with the remainder being substantially all aluminum. High silicon bronze alloy is comprised of about 96% copper and about 3% silicon with the remainder being comprised of manganese, zinc, iron and lead. Low silicon bronze alloy is comprised of about 97-98% copper and about 1-2% silicon with the remainder being comprised of manganese, zinc, iron, and lead.

Therefore, the silicon bronzes contemplated for use in this invention should be comprised of 85-98% copper and about 1-5% silicon with the remainder being comprised of at least one of zinc, manganese, iron, aluminum, tin, lead, or mixtures thereof. It is preferred that the silicon bronzes are comprised of 90-98% copper and 1-4% silicon. The most preferred compositions of silicon bronzes for use in this invention should be comprised of about 95-98% copper and 1-3% silicon.

It is therefore an advantage of the present invention that a nail made of silicon bronze alloy is more suitable to parallel gap welding.

It is an additional advantage that there is an unexpected reduction in the gassing of partially discharged cells.

The effects, features and advantages of the present invention will be demonstrated in the following examples. It is to be understood that these examples are intended to be illustrative only and therefore should not be interpreted to impose any limitations on the invention as claimed.

EXAMPLE 1

"AAAA" size cells are the type used in the manufacture of standard 9 V rectangular batteries(1.0 in. × 65 in.×1.73 in.). Six of these cells fit within this rectangular package in a 2×3 array. Ten AAAA cells are manufactured using a nail made from 70/30 brass. The cells anodes are comprised of particulate amalgamated zinc, the cathodes are comprised of $MnO_2$, and an alkaline electrolyte is dispensed within the cell. These cells have 25% of their capacity removed by discharging them across 30 ohms for 4 hours. They are then stored at 160° F. for 4 weeks and the gas evolved is collected and measured. These cells generate 0.10 ml of hydrogen gas per cell during this period.

EXAMPLE 2

Ten cells are manufactured identically to the cells of the previous example except that the nails are made from nickel silver alloy. These cells are subjected to the identical gassing test as the cells of the previous example. After the 4 week period 0.37 ml of hydrogen gas per cell is collected.

EXAMPLE 3

Ten cells are manufactured identically to the cells of the previous example except that the nails are made from a low silicon bronze alloy. This alloy was analyzed as 97.2% Cu, 2.0% Si, 0.25% Zn, 0.28% Mn, 0.05% Fe, 0.01% Al, 0.03% Pb and 0.01% Sn. These cells are subjected to the identical gassing test as the cells of the previous example. After the 4 week period 0.11 ml of hydrogen gas per cell is collected.

EXAMPLE 4

Twenty cells are made, each having a nail made of 70/30 brass. A segment of nickel tab is welded to the head of each nail using parallel gap electrodes. The force required to break the weld of each tab is measured. An average force of 5.5 pounds is required to break the weld.

EXAMPLE 5

Twenty cells are made, each having a nail made of nickel-silver alloy. A segment of nickel tab is welded to each nail as in the previous example. An average of 8.3 pounds is required to break the weld. This demonstrates the better welding properties of nickel-silver as compared to 70/30 brass.

EXAMPLE 6

Twenty cells are made, each having a nail made of low silicon bronze. A tab is welded to each nail head as in the previous two examples. An average of 8.7 pounds is required to break the weld. This demonstrates that silicon bronze alloys have the welding properties of nickel-silver.

While an embodiment of this invention has been shown and described, it should be understood that the invention is not limited thereto except by the scope of the claims. Various modifications can be made without departing from the scope and spirit of the invention as the same will be understood by those skilled in the art.

What is claimed is:

1. An electrochemical cell comprised of an anode comprised of zinc; a cathode; and alkaline electrolyte; and a current collector comprised of a silicon bronze alloy that is comprised of 85-98% by weight copper and 1-5% by weight silicon with the remainder being comprised of at least one of manganese, iron, zinc, aluminum, tin, lead, or mixtures thereof; and a strip of metal tab stock welded to said current collector, said tab stock being a metal other than silicon bronze alloy.

2. The electrochemical cell of claim 1 wherein the cathode is comprised of manganese dioxide.

3. The electrochemical cell of claim 2 wherein the anode current collector is a nail.

4. The electrochemical cell of claim 3 wherein the zinc anode is amalgamated.

5. The electrochemical cell of claim 4 wherein the silicon bronze alloy is comprised of 90-98% by weight copper and 1-4% by weight silicon.

6. The electrochemical cell of claim 4 wherein the silicon bronze alloy is comprised of 95-98% by weight copper and 1-3% by weight silicon.

7. The electrochemical cell of claim 6 wherein the metal tab stock comprises nickel.

8. A cylindrical electrochemical cell comprised of an anode comprised of particulate amalgamated zinc; a cathode comprised of manganese dioxide; an alkaline electrolyte; and an anode current collector comprised of a silicon bronze alloy that is comprised of 95-98% copper and 1-3% by weight silicon; and a strip of nickel tab stock welded to said current collector.

* * * * *